US007982771B2

(12) United States Patent
Gu et al.

(10) Patent No.: US 7,982,771 B2
(45) Date of Patent: Jul. 19, 2011

(54) METHOD OF EMENDATION FOR ATTENTION TRAJECTORY IN VIDEO CONTENT ANALYSIS

(75) Inventors: Xiao Dong Gu, Beijing (CN); Zhi Bo Chen, Beijing (CN); Charles Wang, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 277 days.

(21) Appl. No.: 11/595,756

(22) Filed: Nov. 9, 2006

(65) Prior Publication Data
US 2007/0121015 A1 May 31, 2007

(30) Foreign Application Priority Data

Nov. 30, 2005 (EP) .................................. 05300974

(51) Int. Cl.
*H04N 5/228* (2006.01)
(52) U.S. Cl. .................................................. 348/208.1
(58) Field of Classification Search .............. 348/208.1, 348/208.4, 208.14
See application file for complete search history.

(56) References Cited

U.S. PATENT DOCUMENTS

| | | | |
|---|---|---|---|
| 2004/0100560 A1* | 5/2004 | Stavely et al. | 348/208.1 |
| 2005/0179784 A1* | 8/2005 | Qi | 348/208.1 |
| 2006/0017814 A1* | 1/2006 | Pinto et al. | 348/208.4 |
| 2006/0066744 A1* | 3/2006 | Stavely et al. | 348/352 |
| 2006/0215036 A1* | 9/2006 | Chung et al. | 348/208.4 |

FOREIGN PATENT DOCUMENTS
EP 1225769 7/2002

OTHER PUBLICATIONS

Ma Y-F et al.: "A User Attention Model for 1-4 Video Summarization" Proceedings ACM Multimedia 2002 10th International Conference on Multimedia Juan-Les-Pins, France, Dec 1-6, 2002, ACM International Multimedia Conference, NY. NY vol. Conf. 10, Dec 1, 2002 pp. 533-542. XP001175055 p. 534, right-hand column p. 537, left-hand column, figure 1.
Search report dated Feb. 7, 2006.
Laurent Itti et al., "A Model of Saliency-Based Visual Attention for Rapid Scene Analysis", IEEE Transactions On Pattern Analysis and Machine Intelligence, vol. 20, No. 11, Nov. 1997.
Zhongkang Lu et al., "Perceptual Region-of-Interest (ROI) based Scalable Video Coding", Joint Video Team (JVT) of ISO/IEC MPEG & ITU-T VCEG (ISO/IEC JTC1/SC29/WG11 and ITU-T SG16 Q.6), 15th Meeting: Busan, KR, Apr. 16-22, 2005.

* cited by examiner

*Primary Examiner* — James M Hannett
(74) *Attorney, Agent, or Firm* — Robert D. Shedd; Vincent E. Duffy; Joel M. Fogelson

(57) ABSTRACT

A method for emendation of attention trajectory in video content analysis is disclosed. The method includes steps of extracting attention area for each frame in a video sequence, each attention area of a frame selectively being a reference for the other frames, projecting the attention area of the reference to a current frame, and determining an enhanced attention area of the current frame by collecting and merging all the projected attention areas together with the original attention area of the current frame to emend the attention trajectory of the video sequence so as to make the attention trajectory smooth. Advantageously, short-life attention or noise is omitted, and the attention area is also enriched, therefore, the smooth of the attention trajectory improves subjective viewing experience of human being.

9 Claims, 3 Drawing Sheets

METHOD OF EMENDATION FOR ATTENTION TRAJECTORY IN VIDEO CONTENT ANALYSIS

This application claims the benefit, under 35 U.S.C. §119 of EP Patent Application 05300974, filed Nov. 30, 2005.

FIELD OF THE INVENTION

The present invention relates to video content analysis technology, and more particularly to a method of emendation of the attention trajectory in the video content analysis.

BACKGROUND OF THE INVENTION

In the technology field of video content analysis, visual attention is the ability to rapidly detect the interesting parts of a given scene. In a typical spatiotemporal visual attention computing model, low level spatial/temporal features are extracted and a master "saliency map" which helps identifying visual attention is generated by feeding all feature maps in a purely bottom-up manner. Identifying visual attention for each of the image sequence, the attention trajectory is then indicated. However, several inherent disadvantages arise in the conventional attention computing scheme: 1) since there are varies of features competed in saliency map, a slight change of any of these features may lead to result differ, which means that so calculated attention trajectory is unstable and blinking time by time; 2) the attention may be fully or partially omitted because of shelter, position of critical saliency degree, or attention boundary etc. in a specific time slot; 3) it may produce noise or very short-life attention, when adopting in attention-based video compression/streaming or other applications, such an un-smooth attention will lead to subjective quality degradation.

As shown in FIG. 1 which indicates the general architecture of Itti's Attention Model. In the Itti's attention model, which is presented by L. Itti, C. Koch and E. Niebur, in "A Model of Saliency-Based Visual Attention for Rapid Scene Analysis", IEEE Transactions on Pattern Analysis and Machine Intelligence, Vol. 20, No. 11, November 1998, visual input is first decomposed into a set of topographic feature maps. Different spatial locations then compete for saliency within each map, such that only locations which locally stand out from their surround can persist. All feature maps feed, in a purely bottom-up manner, into a master "saliency map", which topographically codes for local conspicuity over the entire visual scene.

As an extension of Itti's attention model, Y. F. Ma etc. take temporal features into account, published by Y. F. Ma, L. Lu, H. J. Zhang and M. J. Li, in "A User Attention Model for Video Summarization", ACM Multimedia '02, pp. 533-542, December 2002. In this model, the motion field between the current and the next frame is extracted and a set of motion features, such as motion intensity, spatial coherence and temporal coherence are extracted.

The attention model created by the above scheme is sensitive to feature changes, which lead to un-smooth attention trajectory across time as follows:

(1) Successive images in image sequence are very similar and viewers will not tend to change their visual focus during a time slot, unfortunately, the slight changes between these successive images will make the calculated attention great differ;

(2) When an attention object becomes non-attention or sheltered by a non-attention object for a short period, viewers will not change their visual focus because of their memory knowledge, again, attention models fail to indicate this; and (3) Attention models always generate short-life attention or noise, which in fact will not be able to attract viewer's attention.

In attention-based video applications like ROI (Region of Interest)-based video coding, such un-smoothness will lead to subjective visual quality degradation. In ROI-based video coding, more resource are allocated to the more attractive ROI and thus a more clear ROI while related blurred non-ROI. With an un-smooth ROI trajectory, viewer focused in ROI will notice the changing quality (become clear or blurred from time to time) which lead to an unhappy experience.

Therefore it is desirable to develop an improved method of emendation for attention trajectory to reduce the influence of these disadvantages and make the generated attention smooth.

SUMMARY OF THE INVENTION

In order to smooth the trajectory of attention obtained by varies of attention models, the present invention provides a method of temporal-based emendation for attention trajectory in the video content analysis.

In one aspect, the present invention provides a method for emendation of attention trajectory in video content analysis including extracting attention areas for each frame of a video sequence, each attention area of a frame selectively being a reference for the other frames, characterized in that the method further comprises steps of projecting the attention area for each reference to a current frame; and determining an enhanced attention area of the current frame by collecting all the projected attention areas together with the original attention area of the current frame to emend the attention trajectory of the video sequence so as to make the attention trajectory of the video sequence smooth.

Advantageously, the attention trajectory of the video sequence is smoothened by the temporal emendation efficiently, short-life attention or noise is omitted, and the attention area is also enriched, therefore an improved subjective viewing experience in the attention-based application is achieved.

In another aspect of the invention, the method for emendation of attention trajectory is further characterized for its projecting step which includes imaging the attention areas from the reference to the current frame; and moving the imaged attention area to a new position according to an estimated motion vector. The references to be projected to the current frame include a plurality of forward references and a plurality backward references that are most adjacent to the current frame.

Advantageously, a smooth emendation of attention trajectory is achieved by collecting and merging all the projected attention areas obtained from the plurality of forward and backward references together with the original attention area of the current frame.

DETAIL DESCRIPTION OF PREFERRED EMBODIMENTS

The present invention provides a method of temporal-based emendation for attention trajectory in video content analysis in order to smooth the trajectory of attention obtained by varies of attention models, which presents a strategy to generate stable attention across the time.

When an attention area of an image is located, its corresponding areas in successive images can be projected with the estimated motion, and the prediction areas are used to strengthen the attention area of these successive images calculated by known attention model. In this case the first located attention is treated as a reference while the successive images predict from the reference in locating their own attention, clearly this prediction is forward reference. In the same way, we can define the backward reference. Thus the attention area is smoothed through temporal emendation by collecting and merging all projected attention areas together with the original attention areas of the forward and backward references.

According to one mode of the present invention, the problem to be solved can be denoted as follows:

Input: a video sequence $V=\{V0,V1,V2\ldots Vn-1,Vn\}$ with known attention Model M;

Output: Attention areas $A=\{A0,A1,A2\ldots An-1,An\}$ with smooth trajectory.

With the given attention model M, we can calculate the initial values of attention areas $A'=\{A'0, A'1, A'2 \ldots A'n-1, A'n\}$ with $A'k=M(Vk)$. The object of the present invention is aiming to smooth the unstable $A'$.

Figure 1:
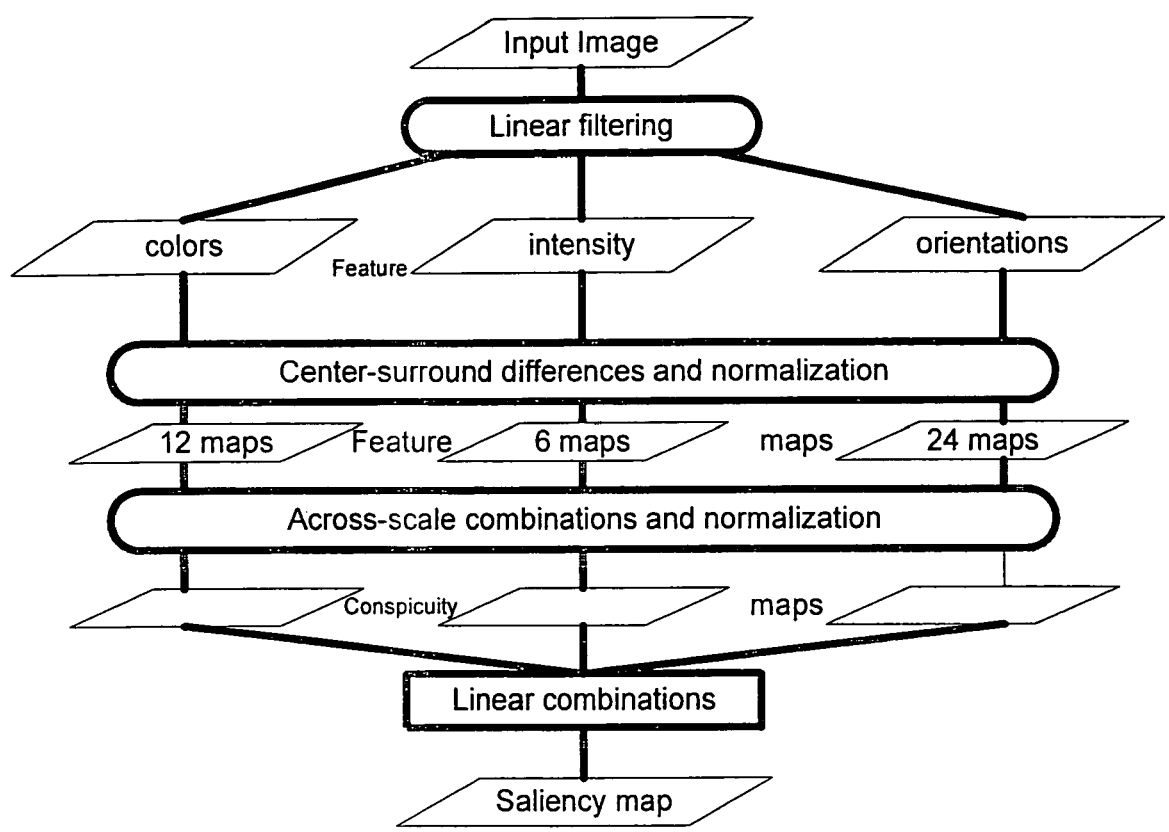
FIG. 1 shows a general architecture of Itti's attention model.
Figure 2:
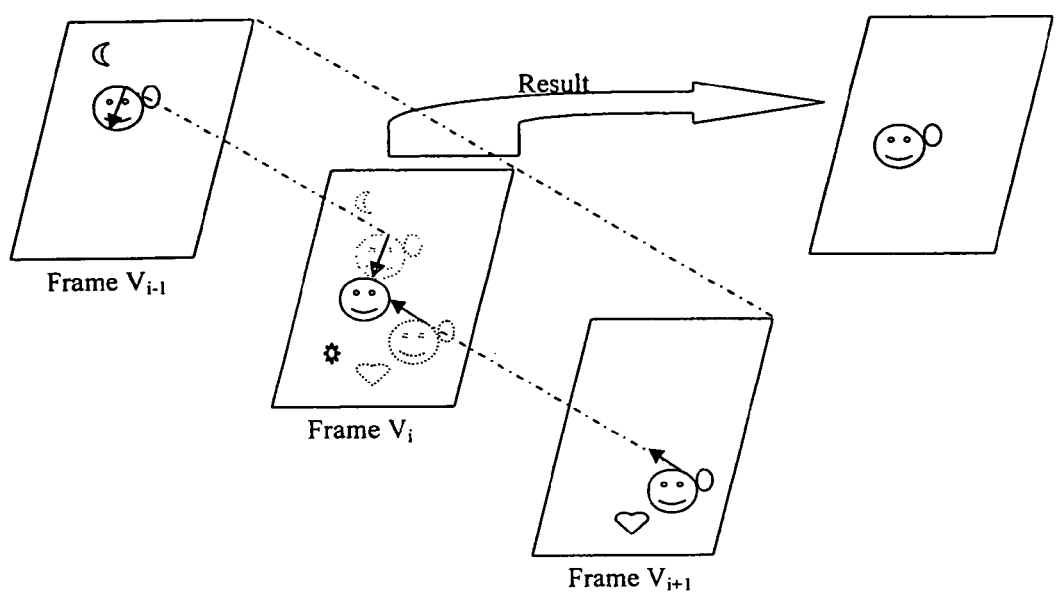
FIG. 2 describes an example of temporal-based emendation for attention trajectory in accordance with the present invention.

FIG. 2 illustrates the method of emendation for the attention trajectory of the present invention in a simplified example. $V_i$ denotes a current frame, $V_{i-1}$ is a forward reference of $V_i$ and $V_{i+1}$ is a backward reference of $V_i$. As shown in FIG. 2, the black solid object in each frame is the attention area of the relative frame calculated by the known attention model M, i.e. the attention area of $V_{i-1}$ is Face+Circle+Moon, the attention area of $V_i$ is Face+Sun, and the attention area of $V_{i+1}$ is Face+Circle+Heart. For each reference, the present invention takes below actions: First, imaging the attention area from the references $V_{i-1}$ and $V_i$ to the current frame $V_i$ as the dotted object in the current frame $V_i$; then, moving this imaged attention area to a new position according to an estimated motion vector, as indicated by the arrows in FIG. 2, the received area in the current frame $V_i$ being called as the projecting attention area of the reference. Finally, all projected the attention areas of all references together with the original attention area of the current frame are collected and merged together and optimized so as to obtain an enhanced attention area of the current frame $V_i$. As described in FIG. 2, the result of the emendation is shown in the upper-right corner, wherein the "Circle" lost in the original current frame is found in the enhanced current frame $V_i$, while all the noise/short-life attentions as "Moon" "Sun" and "Heart" are omitted.

Through the foregoing description, the present invention can be partitioned into two steps: first projecting the attention area for each reference to the current frame; then determining an enhanced attention area of the current frame $V_i$ by collecting and merging all the projected attention areas together with the original attention area of the current frame $V_i$ so as to make the attention trajectory smooth.

Figure 3:
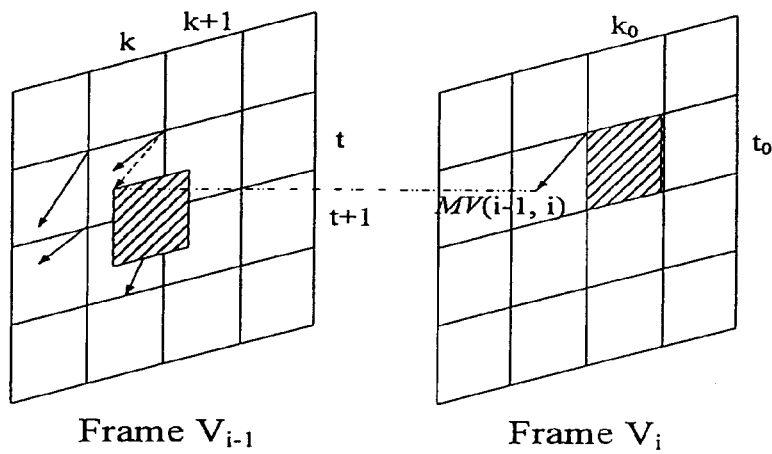
FIG. 3 describes the estimation of an attention model in a frame from a previous frame in accordance with the present invention.

FIG. 3 describes the estimation of the forward reference from $MV(j, i-1)$ to $MV(j, i)$. As illustrated in FIG. 3, considering a macroblock MB (the shadowed block) of the current frame $V_i$, the MB comes from a new position of the forward reference frame $V_{i-1}$, according to $MV(i-1, i)$. In the new position, the MB may cover four MBs of $V_{i-1}$. Denote the four covered MBs as $MB_{k,t}$, $MB_{k+1,t}$, $MB_{k,t+1}$ and $MB_{k+1,t+1}$, and $p_{k,t}$, $p_{k+1,t}$, $p_{k,t+1}$ and $p_{k+1,t+1}$ are the covered ratio of the original MB into the related MBs in the forward reference frame $V_{i-1}$ in respective. Then the motion vector of the shadowed block MB is defined by the weighted combination of the four covered MBs (j<i) as follows:

$MV(j,i)[k_0,t_0]=p_{k,t}*MV(j,i-1)[k,t]+p_{k+1,t}*MV(j,i-1)[k+1,t]+p_{k,t+1}*MV(j,i-1)[k,t+1]+p_{k+1,t+1}*MV(j,i-1)[k+1,t+1]$;

$k=\text{ceil}(k_0+MV_x(i-1,i)[k_0,t_0])$;

$t=\text{ceil}(t_0+MV_y(i-1,i)[k_0,t_0])$;

$P_{m,n}=abs(m-(k_0+MV_x(i-1,i)[k_0,t_0]))*abs(n-(t_0+MV_y(i-1,i)[k_0,t_0]))$;

Wherein $MV_x$, $MV_y$ respectively denote the projection value of MV into x-axis and y-axis, $MV(j, i)$ [k,t] denotes the motion vector of the MB of line t and column k in $MV(j, i)$. Recursively the motion vector field $MV(j, i)$ is defined for j<i, and $MV(i, i)=0$.

Figure 4:
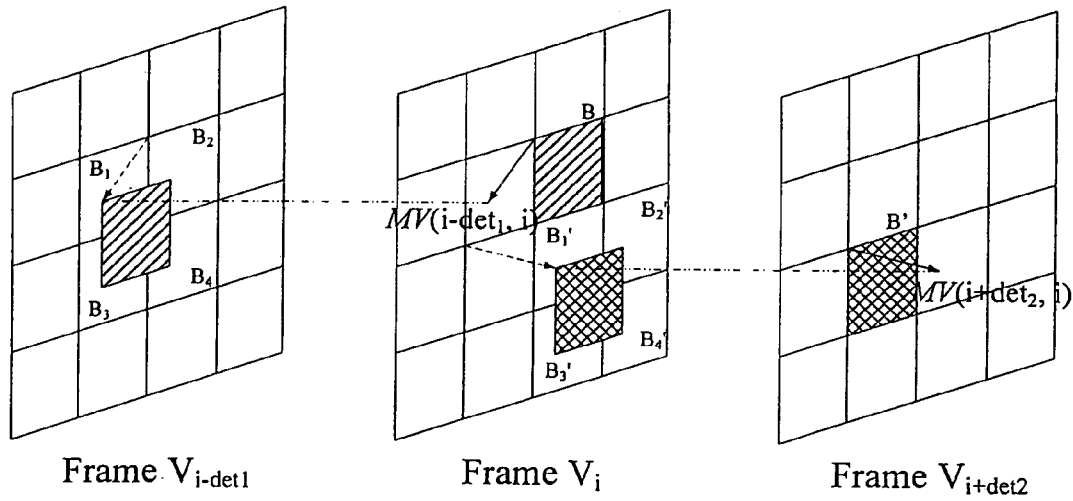
FIG. 4 describes the projection process of forward reference and backward reference in accordance with the present invention.

With thus defined motion vector field $MV(j, i)$, the attention area of each reference is projected to the current frame Vi. The projection process of forward reference and backward reference are different as shown in FIG. 4 ($V_i$ is the current frame while $V_{i-det1}$ is the forward reference and $V_{i+det2}$ is the backward reference).

Forward reference projecting is processed in such a way that each MB of $V_i$ comes from the position of $V_{i-det1}$ which may cover up to 4 MBs of $V_{i-det1}$ according to $MV(i-det_1, i)$, each of which strengthens the considered MB of $V_i$ with a proper weight. As an example shown in FIG. 4, the reference of block B covers $B_1, B_2, B_3$ and $B_4$, with proportion $p_1, p_2, p_3, p_4$ respectively. Wherein f(B, i) denotes the probability that B is the attention area of current frame $V_i$, and f(B, i) is then enhanced by reference frame $V_{i-det1}$ with $$\alpha \cdot \rho(det_1) \cdot \sum_{j=1}^{4}(p_j \cdot f(B_j, i-det_1)),$$

wherein $\alpha$ is a constant and $\rho$ (d) is the attenuation ratio as described in the following paragraph.

Backward reference projecting is processed in such a way that each MB of $V_{i+det2}$ comes from the position of the current frame $V_i$ which may cover up to 4 MBs of $V_i$ according to $MV(i, i+det2)$, each of which is strengthened by that MB of $V_{i+det2}$ with a proper weight. As illustrated in FIG. 4, B' is the reference of the related shadowed block in $V_i$ which covers block $B_1', B_2', B_3'$ and $B_4'$ with proportion $p_1', p_2', p_3', p_4'$ respectively. $f(B_j', i)$ is then enhanced by reference $V_{i+det2}$ with $\alpha \cdot \rho(det_2) \cdot p_j' \cdot f(B', i+det_2)$, for each j=1, 2, 3, 4.

FIG. 4 describes the forward/backward reference projecting process. All the projected attention of references are applied to strengthen the current frame attention with an attenuation ratio $\rho(d)$ where d is the distance from the reference to the current frame. The closer the reference frame is to the current frame, the higher influence the projected attention to current frame attention. Thus $\rho(d_1)<\rho(d_2)$ for $d_1>d_2$, a possible solution is $$\rho(d)=1-d/k,$$

for some constant k. And a such strengthened attention gives the result.

Better reference selection will lead to better attention smoothness. Surely, it's better to select reference inside a video sequence. We need not have to apply other shot boundary detection algorithms. A salient different of attention calculated by the known attention model M indicates the shot boundary we needed. Preferably, inside the video sequence, a plurality of forward references and a plurality of backward references most adjacent to the current frame are selected.

The emendation method for attention trajectory in video content analysis of the present invention has following advantages:
present a simple yet efficient way to generate attention with smooth trajectory;
by temporal emendation, short-life attention or noise is omitted; and
the attention area is also enriched because of the adoption of temporal information.

The method for smooth attention trajectory in video content analysis in accordance with the present invention will greatly improve viewing experience in attention-based applications such as bit-allocation.

The invention claimed is:

1. A method for emendation of attention trajectory of a viewer visual focus in a video sequence comprising the steps of:
   extracting attention area image information of a viewer's visual focus for each frame of the video sequence, each attention area image of a frame selectively being a reference for the other frames; projecting the attention image area for each reference to a current frame; and determining an enhanced attention area image of the current frame,
   wherein the projecting step additionally comprises steps of:
   imaging the attention areas image from the reference to the current frame; and
   moving the imaged attention area image to a new position according to an estimated motion vector of the attention area of the reference;
   the step of determining the enhanced attention area image of the current frame is performed by collecting and merging all the projected attention areas together with the original attention area of the current frame to delete short life attention or noise as to emend the attention trajectory of the video sequence which smoothes the attention trajectory of the video sequence.

2. The method as claimed in claim 1, wherein the references to be projected to the current frame includes forward references and backward references.

3. The method as claimed in claim 2, a plurality of forward references and a plurality of backward references that are most adjacent to the current frame are selected to be projected to the current frame.

4. A method for correcting an attention trajectory of viewer's visual focus in a video sequence comprising the steps of:
   extracting an attention area image information of viewer's visual focus for a frame of the video sequence, wherein the attention area image is a reference for at least one other frame;
   projecting the attention area image for the corresponding reference to a current frame by imaging the attention area image from the reference to the current frame and moving the imaged attention area image to a new position according to an estimated motion vector corresponding to the attention area image from the reference; and
   determining an enhanced attention area image of the current frame by processing the projected attention area image together with said attention area image to delete short life attention or noise and smoothen the appearance of the attention trajectory of the video sequence.

5. The method of claim 4, wherein said processing steps include collecting and merging the projected attention area image together with said attention area image for the frame of the video sequence.

6. The method of claim 4, wherein a frame has at least two attention areas image and the steps of projecting and determining are performed for said attention areas image.

7. The method of claim 4, wherein said method is performed for multiple frames from said video sequence.

8. The method of claim 7, wherein said projected attention area image to the current frame is creating using at least one forward reference frame and at least one backward reference frame.

9. The method of claim 8, wherein said at least one forward reference frame and said at least one backward reference frames are the frames that are most adjacent to the current frame.

* * * * *